United States Patent
Nesbitt et al.

(10) Patent No.: US 8,681,635 B2
(45) Date of Patent: Mar. 25, 2014

(54) COMPUTER-IMPLEMENTED SYSTEMS AND METHODS FOR PLANNING A ROUTE

(75) Inventors: David W. Nesbitt, Port Deposit, MD (US); Leonard B. Jansen, Elizabethtown, PA (US)

(73) Assignee: MapQuest, Inc., Denver, CO (US)

( * ) Notice: Subject to any disclaimer, the term of this patent is extended or adjusted under 35 U.S.C. 154(b) by 505 days.

(21) Appl. No.: 12/982,356

(22) Filed: Dec. 30, 2010

(65) Prior Publication Data

US 2011/0158232 A1 Jun. 30, 2011

Related U.S. Application Data

(60) Provisional application No. 61/291,798, filed on Dec. 31, 2009.

(51) Int. Cl.
*G01R 31/08* (2006.01)

(52) U.S. Cl.
USPC .......................................... 370/238; 370/254

(58) Field of Classification Search
None
See application file for complete search history.

(56) References Cited

U.S. PATENT DOCUMENTS

| | | | |
|---|---|---|---|
| 6,256,295 B1 * | 7/2001 | Callon | 370/254 |
| 6,804,199 B1 * | 10/2004 | Kelly et al. | 370/238 |
| 7,561,526 B2 * | 7/2009 | Naden et al. | 370/238 |
| 8,243,604 B2 * | 8/2012 | Kothari et al. | 370/238 |
| 2004/0151130 A1 * | 8/2004 | Beshai et al. | 370/254 |
| 2005/0088965 A1 * | 4/2005 | Atlas et al. | 370/216 |
| 2007/0064613 A1 * | 3/2007 | Qian et al. | 370/238 |
| 2007/0177594 A1 * | 8/2007 | Kompella | 370/390 |
| 2008/0056137 A1 * | 3/2008 | Ravindran et al. | 370/238 |
| 2008/0101244 A1 * | 5/2008 | Liu et al. | 370/238 |
| 2008/0123532 A1 * | 5/2008 | Ward et al. | 370/238 |
| 2008/0279101 A1 * | 11/2008 | Wu et al. | 370/235 |
| 2009/0052327 A1 * | 2/2009 | Larsson et al. | 370/238 |
| 2009/0079752 A1 * | 3/2009 | Wexler et al. | 345/582 |
| 2009/0168768 A1 * | 7/2009 | Chiabaut et al. | 370/389 |
| 2009/0316583 A1 * | 12/2009 | Li et al. | 370/238 |
| 2010/0322244 A1 * | 12/2010 | Dasylva et al. | 370/390 |
| 2012/0033552 A1 * | 2/2012 | Dasylva et al. | 370/230 |

* cited by examiner

*Primary Examiner* — Phirin Sam
(74) *Attorney, Agent, or Firm* — Finnegan, Henderson, Farabow, Garrett & Dunner LLP (57) ABSTRACT

Systems and methods are disclosed for determining shortest route(s) or path(s) to one or more destination nodes from one or more origin nodes. In accordance with one implementation, a computer-implemented method is provided that includes identifying a plurality of origin nodes associated with a route based on a threshold distance from at least one destination node, the origin nodes being options for a departure from the route to the at least one destination node. Further, the method may include calculating, using a processor, a cost associated with travelling from each of the origin nodes to at least one common intermediate node between the route and the at least one destination node, and determining a path to the at least one destination node based on the origin node having the lowest calculated cost.

20 Claims, 8 Drawing Sheets

| Step | Traverse From | Traverse To | Adjacency List | Done Set |
|---|---|---|---|---|
| 1 | – | $O_1$ | (X1, 3) | $O_1$ |
| 2 | – | $O_2$ | (X1, 3); (X2, 2) | $O_1$, $O_2$ |
| 3 | $O_2$ | X2 | (X1, 3); (X3, 7) | $O_1$, $O_2$, X2 |
| 4 | $O_1$ | X1 | (X3, 7); (X5, 10) | $O_1$, $O_2$, X2, X1 |
| 5 | X2 | X3 | (X5, 10); ($D_1$, 8) | $O_1$, $O_2$, X1-X3 |
| 6 | X3 | $D_1$ | – | – |

TABLE 404

COMPUTER-IMPLEMENTED SYSTEMS AND METHODS FOR PLANNING A ROUTE

RELATED APPLICATION

This application claim priority from U.S. Provisional Application No. 61/291,798, filed on Dec. 31, 2009, the contents of which are expressly incorporated herein by reference in their entirety.

DETAILED DESCRIPTION

1. Technical Field

The present disclosure relates to the field of electronic mapping and route planning. More particularly, and without limitation, the present disclosure relates to computer-implemented systems and methods for determining shortest route(s) or path(s) to one or more destination nodes from one or more origin nodes.

2. Background

Graphs are often used in the fields of mathematics and computer science. A graph may include nodes, as well as edges connecting the nodes. An edge between two nodes may be associated, for example, with a cost to travel or traverse between the two nodes.

Graphs may be used to model many types of relationships. For example, a graph may be used to model a social network or a telecommunication network. Graphs may also be used to represent maps. For example, a graph may represent a road map, where each node of the graph represents a road intersection, and each edge of the graph represents a road segment linking two intersections. The cost associated with each edge may correspond to a distance and/or time it takes to travel between the two intersections. A mapping program may use the graph to calculate directions between two points or nodes.

It may be desirable to calculate a route between two points on a map. For example, a user may use the mapping program to determine a route for driving directions between two points. Using the map, the corresponding route may be highlighted or otherwise displayed. The route in the map can correspond to a route in a graph having nodes and edges connecting the nodes.

A user may also be interested in making one or more detours from a determined route to one or more points of interest (POIs) on the map, such as a hotel, restaurant, hospital, gas station, or historical landmark. The POIs can be viewed as destination nodes in the graph that are not part of the route. The user may want to determine the fastest or shortest path to get from the determined route to the POIs. For example, if the user is driving, the user may seek the closest gas station or fast food restaurant off the route.

There are several known algorithms for calculating distances between nodes of a graph, such as: Dijkstra's algorithm, Moore's algorithm, Floyd-Warshall's algorithm, Bellman-Ford's algorithm, and Johnson's algorithm. However, these algorithms perform multiple iterations and are too costly or inefficient for the purpose of calculating costs or a shortest path from points along a route in a graph to a destination node (POI). Indeed, there may be a very large number of origin nodes from which a user may depart from the route, and a large number of destination nodes.

Accordingly, there is a need for improved systems and methods for analyzing one or more destination nodes, including the ability to analyze costs and determine a shortest distance from points along a route to at least one destination node or point. More generally, there is also a need to provide more efficient algorithms for calculating costs or distances between nodes on a graph when determining a route or path.

SUMMARY

Accordingly, there is disclosed a computer-implemented method comprising the steps of: identifying a plurality of origin nodes associated with a route based on a threshold distance from at least one destination node, the origin nodes providing options for a departure from the route to the at least one destination node; calculating, using a processor, a cost associated with travelling from each of the origin nodes to at least one common intermediate node between the route and the at least one destination node; and determining a path to the at least one destination node based on the origin node having the lowest calculated cost.

There is further disclosed a computer-implemented method for determining a shortest path from a route to at least one destination node off the route, comprising the steps of: determining, using a processor, a first cost from a first origin node on the route to an intermediate node; associating the intermediate node with the first cost in a list; determining, using a processor, a second cost from a second origin node on the route to the intermediate node; overwriting the first cost with the second cost in the list when the second cost is less than the first cost; determining a next node that is associated with a smallest cost in the list; and determining a shortest path from the route to the destination node based on the determined costs associated with at least the first origin node and second origin node on the route.

There is further disclosed a system for determining costs related to at least one destination node, comprising: a server; and a database coupled to the server, wherein a processor executing on the server is configured to: determine a first cost from a first origin node on the route to an intermediate node; associate the intermediate node with the first cost in a list; determine a second cost from a second origin node on the route to the intermediate node; overwrite the first cost with the second cost in the list when the second cost is less than the first cost; and determine a next node that is associated with a smallest cost in the list.

There is further disclosed a computer-readable medium comprising program instructions for determining a shortest path from a route to at least one destination node off the route, the program instructions, when executed by a processor, cause the processor to perform the following steps: determining a first cost from a first origin node on the route to an intermediate node; associating the intermediate node with the first cost in a list; determining a second cost from a second origin node on the route to the intermediate node; overwriting the first cost with the second cost in the list when the second cost is less than the first cost; determining a next node that is associated with a smallest cost in the list; and determining the shortest path from the route to the destination node based on the determined costs associated with at least the first origin node and the second origin node on the route.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Figure 1:
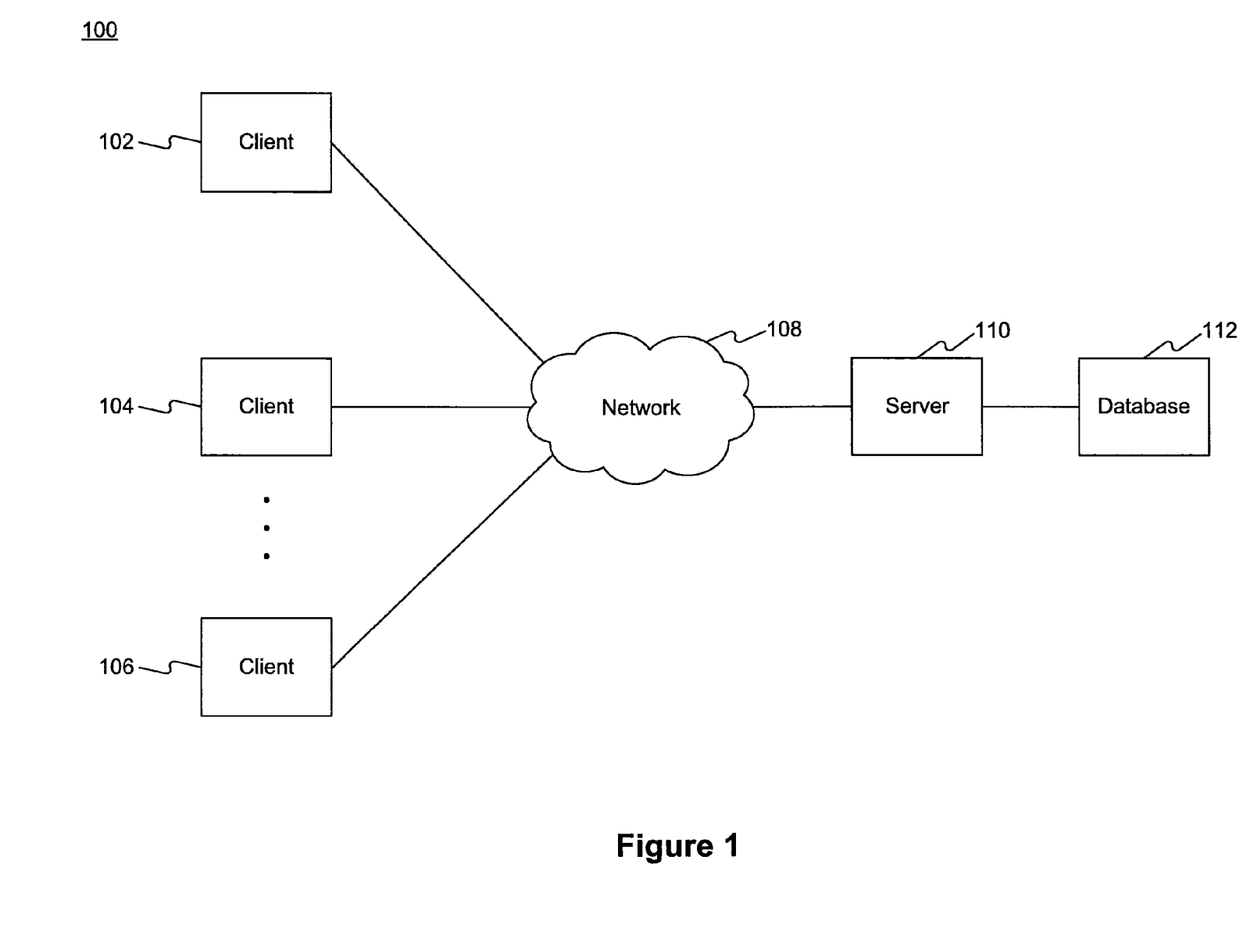
FIG. 1 illustrates an exemplary environment within which embodiments of the present disclosure may be practiced.

FIG. 1 illustrates an exemplary environment 100 within which embodiments of the present disclosure may be practiced. As shown in FIG. 1, a plurality of clients 102, 104, and 106 may be connected to a network 108 and communicate with one or more servers 110. Although the embodiment of FIG. 1 includes three clients and one server, it will be appreciated that exemplary environment 100 may include any number of clients and servers without departing from the spirit or scope of the present disclosure. Clients 102-106 may include a personal computer, a laptop, a component of a computer, a mobile phone or device, a PDA, etc. Moreover, clients 102-106 may alternatively be other types of computing devices, such as peer devices.

Communications network 108 may represent any combination of networks or medium for providing digital data communication. Communication network 108 may include, for example, a local area network ("LAN"), and intranet, and/or a wide area network ("WAN"), e.g., the Internet. In the embodiments described herein, network 108 may include any publicly-accessible network or networks and support numerous communication protocols, including, but not limited to, hypertext transfer protocol (HTTP) and transmission control protocol (TCP/IP).

Network 108 may be connected to one or more servers 110. In this way, clients 102-106 may be coupled to server 110. Each server 110 may be further coupled to a database 112. It will be appreciated that server 110 may include any number or combination of computers or servers, and that databases 112 may include any number or combination of databases, which may be arranged in a "distributed computing" environment. Server 110 and database 112 may be independent devices or may be incorporated into a single unit of hardware, e.g., a single computer system or single server system. In one embodiment, server 110 may include a software application, such as a web service, executing on a computer. An example of a web service is a mapping service that receives inputs from users and calculates routes and/or provides driving directions and POIs. Clients 102, 104, and 106, and additionally, server 110 and database 112, may represent any type of computer system.

Figure 2:
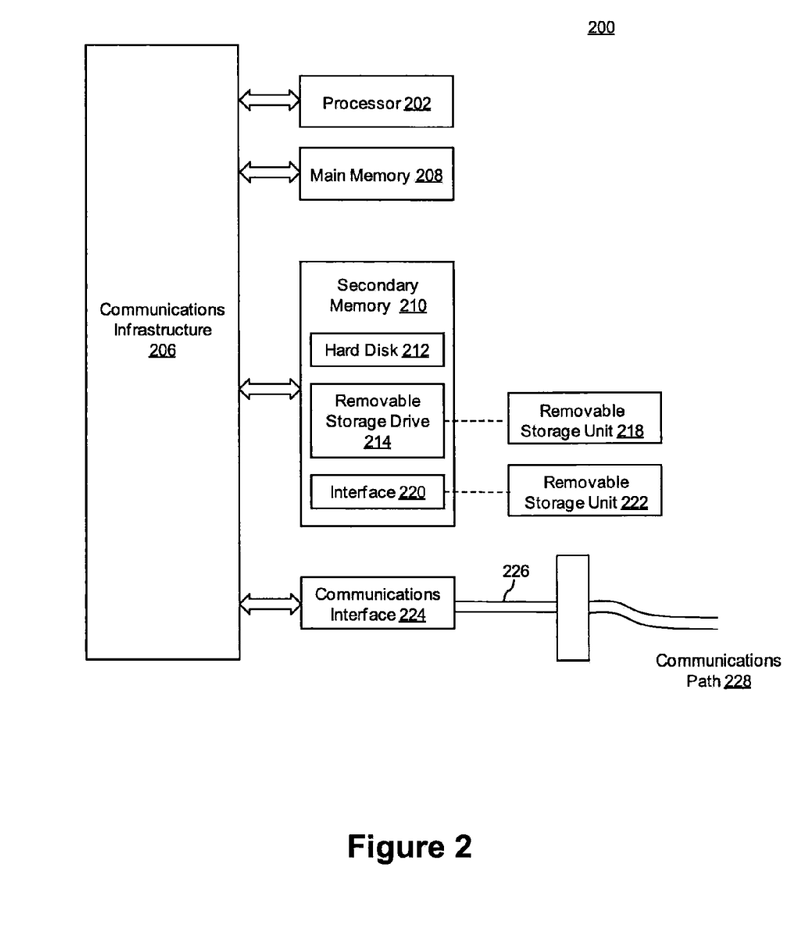
FIG. 2 is an exemplary computer architecture for implementing embodiments of the present disclosure.

FIG. 2 is an exemplary computer architecture 200 for implementing embodiments of the present disclosure. Computer architecture 200 may be used to implement, for example, any of clients 102-106, server 110, and/or database 112. Exemplary computer architecture 200 may include one or more processors, such as processor 202. Processor 202 may be connected to a communication infrastructure 206, such as a bus and/or network, e.g., network 108 of FIG. 1.

Computer architecture 200 may also include a main memory 208, for example, a random access memory (RAM), and may include a secondary memory 210. The secondary memory 210 may include, for example, a hard disk drive 212 and/or a removable storage drive 214, such as a magnetic tape drive, an optical disk drive, CD/DVD drive, etc. The removable storage drive 214 may read from and/or write to a removable storage unit 218. Removable storage unit 218 may include a magnetic tape, an optical disk, or other storage medium that is read by and written to by removable storage drive 214. Consistent with certain embodiments, the removable storage unit 218 can represent a computer readable medium having stored therein one or more computer programs, sets of instructions, code, or data.

Additionally, or alternatively, secondary memory 210 may include other means for allowing computer programs or program instructions and data to be loaded into computer architecture 200. For example, as shown in FIG. 2, a removable storage unit 222 and an interface 220 may be provided. Examples of removable storage unit 222 and interface 220 include a removable memory chip (e.g., EPROM, RAM, ROM, DRAM, EEPROM, flash memory devices, or other volatile or non-volatile memory devices) and associated socket. As will be appreciated, other types of removable storage units 222 and interfaces 220 may be provided to allow instructions and data to be transferred from the removable storage unit 222 to computer architecture 200.

Computer architecture 200 may also include one or more communications interfaces, such as communications interface 224. Communications interface 224 may allow computer programs and data to be transferred between computer architecture 200 and external devices. Examples of communications interface 224 include a modem, a network interface (e.g., an Ethernet card), a communications port, a PCMCIA slot and card, etc. Computer programs and data may be transferred via communications interface 224 in the form of signals 226, which may be electronic, electromagnetic, optical or other signals capable of being received by communications interface 224. Signals 226 may be provided to communications interface 224 via a communications path 228 (i.e., a channel). Channel 228 carries signals 226 and may be implemented using wire or cable, fiber optics, an RF link and other forms of communications channels. In one embodiment, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer architecture 200. Such computer programs and/or sets of instructions can be stored within one or more computer readable mediums. Additionally or alternatively, computer programs and/or sets of instructions may also be received via communications interface 224 and stored one or more computer readable mediums.

Such computer programs and sets of instructions, when executed by processor 202, enable processor 202 to perform the computer-implemented methods described herein. Examples of sets of instructions include, for example, machine code, such as produced by a compiler, and files containing a high-level code that can be executed by processor 202 using an interpreter.

Figure 3:
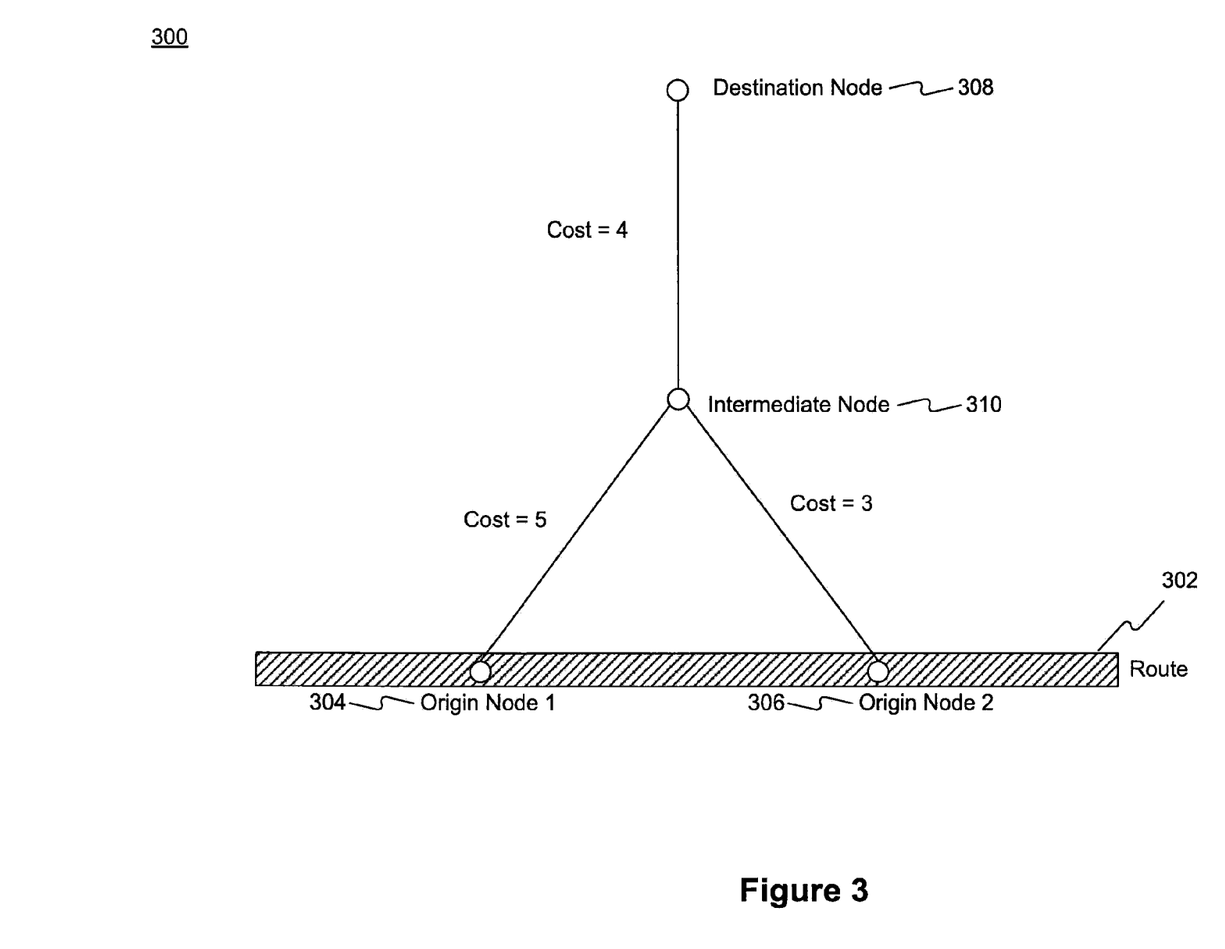
FIG. 3 includes an exemplary graph and method for calculating costs and a shortest path to at least one destination node, consistent with certain embodiments of the present disclosure.

FIG. 3 illustrates an exemplary graph 300 and method for calculating costs and a shortest path from a route to at least one destination node, consistent with the disclosed embodiments. Graph 300 includes a route 302. Route 302 may include a plurality of nodes adjacent to one another, such as origin node 1 (304) and origin node 2 (306). Graph 300 also includes a destination node 308 and an intermediate node 310, which are external to route 302. Intermediate node 310 is a node disposed between origin node 304, origin node 306, and destination node 308. It may be desirable to determine a shortest path from route 302 to destination node 308 via intermediate node 310, starting from either origin node 304, origin node 306, or any other node along route 302.

In certain embodiments, route 302 may be calculated by a mapping program or service (such as server 110) that calculates directions between two points and displays the corresponding route on a map presented to a user (such as a user at client 102). The user may seek to detour from route 302 and travel to a POI, such as a gas station, represented by destination node 308. In particular, the user may seek the shortest distance or path to the gas station (e.g., destination node 308), either from node 304 or node 306.

One way of calculating the shortest path with, for example, server 110, would be to use to Dijkstra's algorithm. For example, Dijkstra's algorithm could be executed twice, first to calculate the shortest path between origin node 304 and destination node 308, and then to calculate the shortest path between origin node 306 and destination node 308. The shorter path of the two calculations would then be identified as the shortest path between route 302 and destination node 308.

The first run of Dijkstra's algorithm starts at origin node 304 and determines that the cost to travel to intermediate node 310 is 5. The first run also determines that the cost from intermediate node 310 to destination node 308 is 4. Therefore, the first run determines that the cost associated with the path from origin node 304 to destination node 308 is 9 (=5+4).

The second run of Dijkstra's algorithm starts at origin node 306 and determines that the cost to travel to intermediate node 310 is 3. The second run also determines that the cost from intermediate node 310 to destination node 308 is 4. Therefore, the second run determines that the cost associated with the path from origin node 306 to destination node 308 is 7 (=3+4). After completing the two runs, the cost of the path from run two (7) may be found to be less than the cost of the path from run one (9). Therefore, it may be determined that the shortest path from route 302 to destination node 308 starts from origin node 306.

As demonstrated above with the example of FIG. 3, Dijkstra's algorithm requires a different run for analyzing each origin and destination node pair. The algorithm, therefore, is potentially processor intensive, especially when there are many origin nodes and/or destination nodes. Consistent with disclosed embodiments of the present disclosure, an improved method for calculating the shortest path may collapse multiple Dijkstra runs into a single run, and therefore, may be less processor intensive.

Consistent with certain embodiments of the present disclosure, a computer-implemented method may be provided that begins traversing from origin node 304 to destination node 308. During the traversal, the method identifies intermediate node 310, and determines that the cost from origin node 304 to intermediate node 310 is 5. The cost of 5 is associated with intermediate node 310, and may be stored, for example, in a list in computer memory. The method also begins traversing from origin node 306 to destination node 308. During the traversal, the method identifies intermediate node 310, and determines that the cost from origin node 306 to intermediate node 310 is 3. The method compares the two costs to intermediate node 310, and determines that the cost from origin node 306 (of 3) is less than the cost from origin node 304 (of 5). In addition, the method overwrites the cost of 5 in the list with the cost of 3, thereby associating the cost of reaching intermediate node 310 to 3 instead of 5. If the cost from origin node 306 to intermediate node 310 were instead greater than the cost from origin node 304 to intermediate node 310, then the algorithm would not have overwritten the memory. The method then determines that the cost from intermediate node 310 to destination node 308 is 4, and calculates the shortest path from route 302 to destination node 308 as 7 (=3+4).

Accordingly, the above-described method may be utilized to collapse the multiple runs of Dijkstra's algorithm into a single or fewer runs to avoid redundancy. This is done in part by determining any intermediate nodes shared by paths originating from different origin nodes. A cost to an intermediate node is set as the lowest value of the costs from the origin nodes. This may result in greater efficiency or considerable processor savings when origin nodes share one or more intermediate nodes on their respective shortest paths to the one or more destination nodes.

Figure 4A:
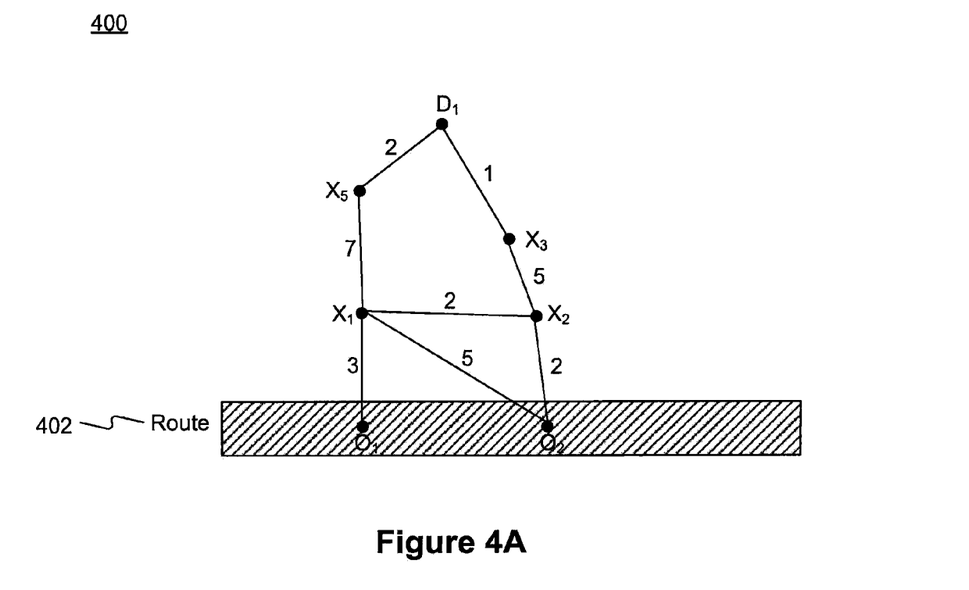
FIGS. 4A and 4B illustrate an exemplary graph and method for calculating costs and a shortest path to at least one destination node, consistent with certain embodiments of the present disclosure.

FIGS. 4A and 4B illustrate an exemplary graph 400 and method for calculating a shortest path from a route to at least one destination node. As shown in FIG. 4A, graph 400 includes route 402, a plurality of nodes, and a plurality of edges connecting the nodes. The edges all have costs associated with travelling from one of their endpoint nodes to another. The graph in FIG. 4A may be used in a mapping or routing environment. For example, route 402 may be a calculated vehicle route by road, with D1 being a POI or destination off the calculated route. Nodes O1 and O2 may correspond to intersections on the route, that allow for an exit off the route to D1.

Figure 4B:
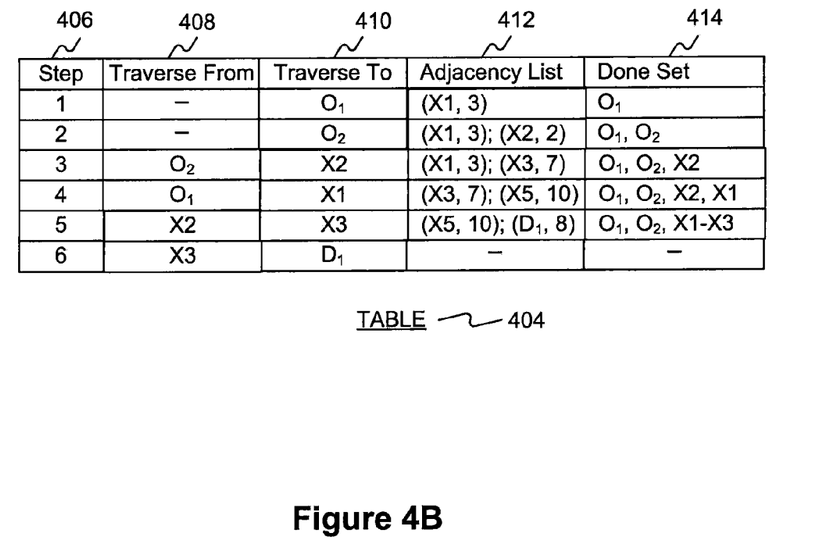

FIG. 4B includes a table 404, which illustrates the steps and associated variables for a method consistent with the present disclosure. Table 404 includes a column 406, which indicates the various steps of an exemplary method consistent with the present disclosure. The steps are used only to illustrate the stages or functionality of the method, but do not necessarily correspond to a processor steps or instructions. Portions of table 404 may be stored as a data structure in memory or storage, for example, in database 112 in FIG. 1.

Table 404 also includes columns 408 and 410 that identify a traversal of graph 400. The disclosed method may execute by traversing to nodes of graph 400. When the method traverses to a node, it identifies all links to the traversed node, and their respective costs. Moreover, when the method traverses to a node, the lowest cost from route 402 to the traversed node becomes known. Column 408 indicates the node traversed from for each particular step, while column 410 indicates the node traversed to for each step.

Table 404 also includes a column 412 that identifies an adjacency list for each step. The adjacency list may be stored in computer memory. The adjacency list may include one or more entries. Each entry in the adjacency list may identify a node and an estimated cost between the node and route 402. The cost is estimated because the nodes in the adjacency list have not yet been traversed to. Accordingly, the cost may be overwritten if a lower cost to the node is later determined.

The nodes from the adjacency list are candidate nodes for being traversed to. In particular, the inventive method may traverse to a node from the adjacency list associated with the lowest cost. The traversed-to node may then be removed from the adjacency list. The method may then add the neighbors of the traversed-to node to the adjacency list with their respective estimated costs calculated from route 402, via the traversed-to node. If one of the neighbors is already in the adjacency list, then the method may overwrite the existing cost with a new cost calculated from route 402 via the traversed-to node, if the new cost is less than the existing cost. Alternatively, the method may not overwrite the existing cost if it is less than the new cost. These principles will be discussed further in the example below.

Table 404 further includes a column 414 corresponding to a done set. When the method traverses to a node, it may add the node to the done set. A node in the done set is not traversed to again.

Table 404 and graph 400 illustrate an exemplary implementation of the method. Step 1 is an initial step at which the method traverses to origin node O1. Node O1 is added to the done set, so that it is never traversed to again. The method determines that O1 has one neighbor, X1, and determines a cost of 3 between O1 and X1, and thus adds X1 to the adjacency list. Accordingly, the adjacency list now has an entry of (X1, 3).

Step 2 is another initial step at which the method traverses to origin node O2. Node O2 is added to the done set, so that it is never traversed to again. Node O2 has two neighbors, X1 at a cost of 5, and X2 at a cost of 2. The method determines that X1 is already in the adjacency list and is associated with a value 3 (calculated from O1), which is less than the new value of 5 (calculated from O2). Therefore, the method does not overwrite the value associated with X1. Neighbor X2, however, is not in the adjacently list, and so the method adds X2 to the adjacency list associated with its cost to O2 of 2. The adjacency list now has the lowest known (i.e., estimated) costs from route 402 to nodes X1 and X2.

As such, the method performs an initial step for each origin node (in this case, O1 and O2). The method spreads out from the origin nodes depending on the next node in the adjacency with the lowest cost.

Upon completion of step 2, there are two entries in the adjacency list, (X1, 3) and (X2, 2). Because the lowest cost node in the adjacency list is X2 at a cost of 2, the method traverses from O2 to X2 at step 3. The reason that the method traverses from O2, is because X2 and its associated cost in the adjacency list were originally determined during a traversal to O2, during step 2. Node X2 is added to the done set. After traversal, the method considers the neighbors of X2 and their respective total costs, for possible addition to the adjacency list. The method does not consider any nodes from the done set, since those nodes have already been traversed to.

The neighbors of X2 are O2, X1, and X3. Because neighbor O2 is in the done set, it is not considered. The total cost of neighbor X1 through currently traversed node X2 is 4; calculated as a cost of 2 from O2 to X2 plus a cost of 2 from X2 to X1. The adjacency list already has an entry for X1 at a lower cost of 3 from the route. Thus, the entry for X1 is not rewritten by the new cost from X2, and remains as-is in the adjacency list. The method also determines a total cost for the next neighbor of X2, which is X3. The total cost for X3 is 7; calculated as a cost 2 from O2 to X2 plus a cost of 5 from X2 to X3. Because there is no entry for X3 in the adjacency list, the algorithm adds an entry for (X3, 7).

At step 4, the method determines the lowest cost node in the adjacency list from the end of step 3, which is now X1. At step 4, the method traverses from O1 to X1, and adds X1 to the done set. The reason that the method traverses from O1, is because X1 and its associated cost in the adjacency list were originally determined during a traversal to O1 during step 1. The method considers the neighbors of X1. Neighbors O1, O2, and X2 are ignored because they are in the done set. Neighbor X5 has a cost of 7 from O1 via X1, and is added anew to the adjacency list as (X5, 10); calculated as a cost 3 from O1 to X1, plus a cost of 7 from X1 to X5.

At step 5, the method determines that the lowest cost node in the adjacency list (from the end of step 4) is now X3, with a corresponding cost of 7. The method thus traverses from X2 to X3, and adds X3 to the done set. The reason that the method traverses from X2, is because X3 and its associated cost in the adjacency list were originally determined during a traversal to X2 during step 3. The method considers the neighbors of X3. Neighbor X2 is ignored because it is in the done set. Neighbor D1 has a cost of 8 from O2 via X3, and is added anew to the adjacency list.

At step 6, the method determines that the lowest cost node in the adjacency list (from the end of step 5) is now D1. The method traverses from X3 to D1, and determines that D1 is the sole destination node, and has a cost of 8 from O2. The reason that the method traverses from X3, is because D1 and its associated cost in the adjacency list were originally determined during a traversal to X3 during step 5. Thus, the cost of 8 is the shortest path from route 402 to destination node D1.

The method may then retrieve (D1, 8) from the adjacency list. The method may also associate (D1, 8) with the starting node from route 402 used for traversing to D1 at a cost of 8, i.e., origin node O2. The method may determine that O2 is the origin node for (D1, 8) by tracing back through table 404, by flagging O2, or by keeping track of O2 by any other way as known by those of ordinary skill in the art. The association of (D1, 8) with O2, may indicate that the shortest path from route 402 to node D1 is via O2, at a cost of 8. The method may store and/or associate, in database 112 from FIG. 1, D1, O2, and/or the cost of 8.

In some embodiments, node D1 may be an intermediate node on the way to a different destination node. As such, the value of 8 can be stored if the method later traverses through D1 to reach another destination node.

If a user decides to travel from route 402 to destination node D1, the method may access D1 from database 112, and may determine that the shortest path from route 402 to D1 is via origin node O2. Additionally, the method may run an additional routing algorithm using O2 and D1 as endpoints to determine the path between these points. Alternatively, the method may use additional techniques for determining the shortest path between O2 and D1. For example, the method may trace back through table 404 to determine the shortest route between O2 and D1.

If there were additional destination nodes, then the method would continue in a similar fashion until all destination nodes were traversed. In this example, because D1 is the only destination node, the above-described method stops with D1.

In certain embodiments, the method may not consider nodes that have more than a certain cost from route 402. In particular, the method may not add a node to the adjacency list if the total cost to the node is greater than or equal to a predetermined threshold amount. For example, if the threshold value is set at 9, then the method may not add node X5 to the adjacency list, since the total cost between X5 and O2 is 10. This may be useful if route 402 represents a route on a map, and destination D1 represents a POI, such as a gas station. The driver may not want to travel more than a certain time/distance (i.e., the threshold cost) off the route. Thus, the method may automatically ignore any node with a cost greater than or equal to the threshold cost.

The example of FIGS. 4A and 4B is simplified to illustrate an exemplary method consistent with the disclosed embodiments. However, the embodiments consistent with the present disclosure can efficiently process large numbers of origin nodes and large numbers of destination nodes. Indeed, for purposes of route planning, it may be desirable to calculate routes and a shortest path between the route with many origin nodes and a large number of destination nodes. The origin nodes along the route may be stored in an origin list in computer memory, while the destination nodes external to the route may be stored in a destination list in computer memory. The origin list and destination list may be implemented and stored as a list, a queue, a matrix, or any other data structure.

In accordance with certain embodiments, the distance from the route of many origin nodes to the destination nodes may be calculated with fewer computations than the traditional use of Dijkstra's algorithm. In some cases, it may be desirable to prune or reduce the sizes of the origin list and the destination list to further improve the process of calculating the shortest path. Indeed, eliminating unnecessary origin nodes and destination nodes can significantly reduce the number of computations involved in calculating a shortest path from the route to the destination nodes.

Figure 5:
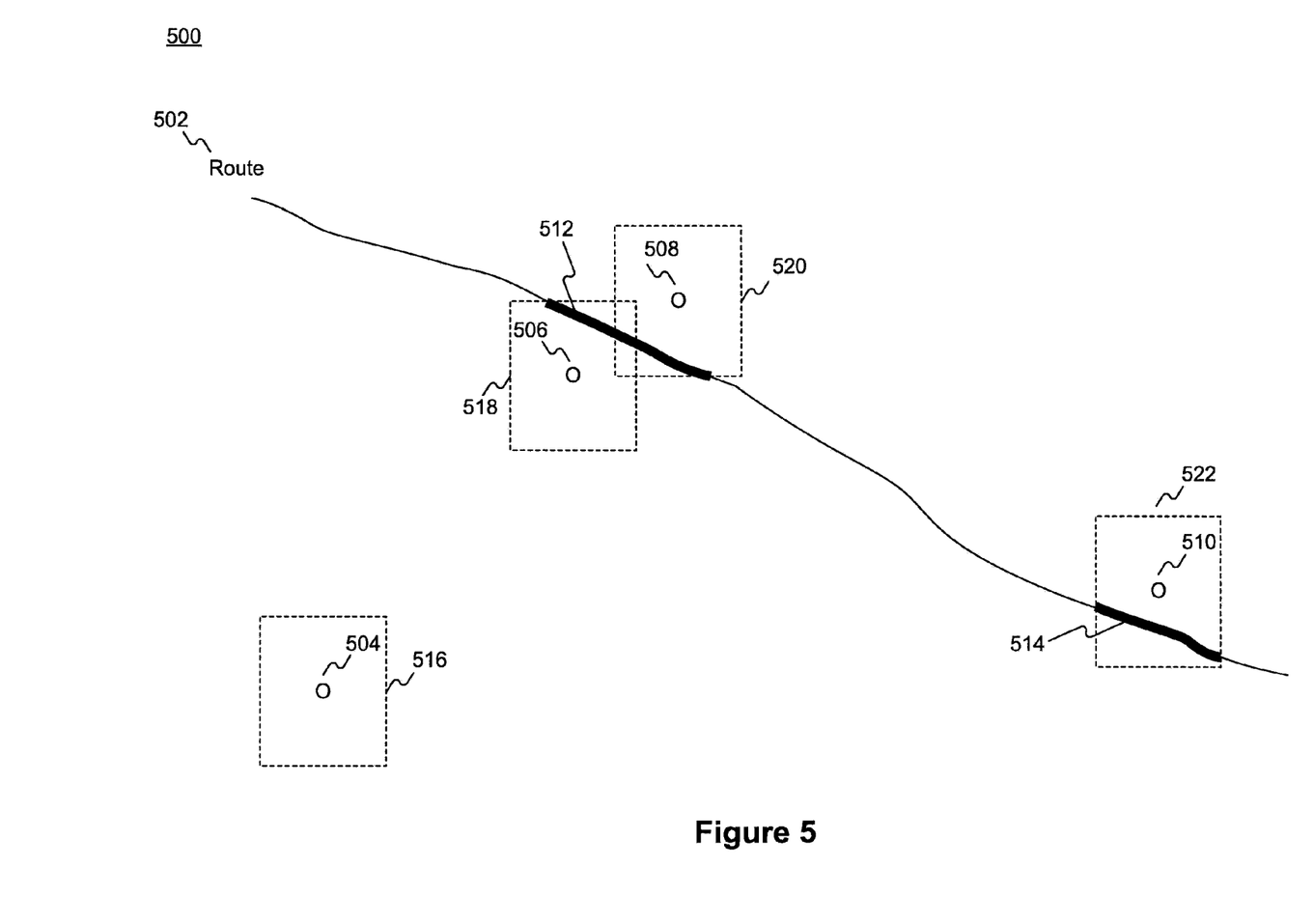
FIG. 5 illustrates an exemplary route, origin nodes along the route, and destination nodes that can be reduced into reduced origin and destination matrices, consistent with certain embodiments of the present disclosure.

FIG. 5 illustrates an exemplary route and method for reducing the size of an origin list and a destination list. More specifically, FIG. 5 includes a graph 500 with a route 502. Route 502 may be a series of adjacent nodes, which may comprise a plurality of origin nodes stored in computer memory as an origin list. In some embodiments, route 502 may represent a map route. Graph 500 also includes destination nodes 504, 506, 508, and 510, which may be stored in computer memory as a destination list. In some embodiments, destination nodes 504-510 may represent POIs that are off route 502, such as gas stations, restaurants, hotels, etc.

From each origin node along route 502, the inventive methods described herein may involve reducing the size of the destination list by determining if there are any destination nodes within a first threshold distance of each origin node on route 502. In the map example, the first threshold distance may be calculated as a physical distance, e.g., 1, 2, 5, or 10 miles, from each origin node on route 502. For example, in one embodiment, the method may determine, for each of destination nodes 504-510, whether any part of route 502 is within a first threshold distance from the destination node.

For example, graph 500 includes an area 516 around destination node 504. Area 516 represents the extent of the first threshold distance measured around destination node 504. Because no part of route 502 falls within area 516, destination node 504 may be excluded from the destination list. Graph 500 similarly includes area 518 around destination node 506, area 520 around destination node 508, and area 522 around destination node 510. Because part of route node 502 falls within each of areas 518-522, corresponding destination nodes 506-510 are retained in the destination list.

The method may also involve reducing the origin list, by determining that only certain origin nodes of route 502 are within the second threshold distance of any of destination nodes 504-510. In the example of FIG. 5, the second threshold distance may be calculated as a physical distance, e.g., 1, 2, 5, or 10 miles, and may be the same as or different from the first threshold distance. The method may modify the origin list to include only those origin nodes that fall within the second threshold distance of a destination node in the reduced destination list.

For example, only origin nodes within a route portion 512 and a route portion 514 are within the second threshold distance of any of destination nodes 506-510. Therefore, the origin list can be modified to include only those origin nodes from route portions 512 and 514. This may result in a considerable reduction in size of the origin list. In this way, the origin list and destination list are pruned or modified to reduce the number of computations in calculating costs and a shortest path between a route and at least one destination node.

Figure 6:
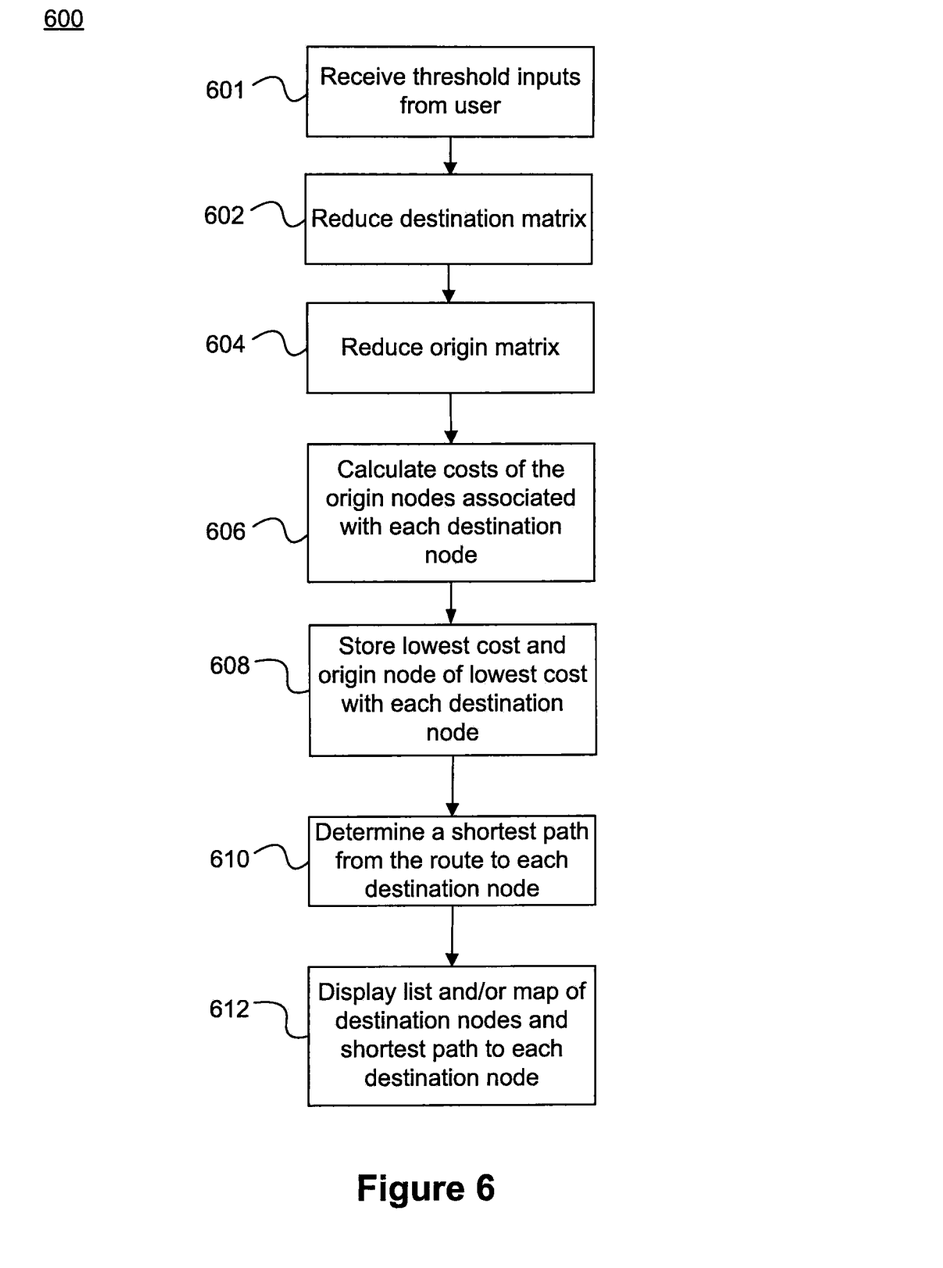
FIG. 6 illustrates a flowchart of an exemplary method for reducing origin and destination matrices and determining the shortest path to each destination node.

FIG. 6 illustrates a flowchart of an exemplary method 600 for reducing the origin and destination matrices and determining costs and the shortest path to each destination node. As shown in FIG. 6, the exemplary method 600 may include receiving threshold inputs from a user (step 601). For instance, a user may input thresholds that reflect how far away a destination node may be from the route, and how far away an origin node may be from a destination node. The user may input a time and/or distance value for each threshold. Method 600 may further include reducing a destination list (step 602) and reducing an origin list (step 604), as described above with respect to FIG. 5. For example, the destination list may be reduced to only those destination nodes within a first threshold distance from the route, while the origin list may be reduced to only those origin nodes within a second threshold distance from each destination node.

Method 600 may further include calculating the costs of all of the origin nodes associated with each destination node (step 606). For instance, referring to the graph depicted in FIG. 5, method 600 may include determining the cost associated with all of the origin nodes along route portions 512 and 514 for destination nodes 506-510, consistent with the inventive methods described above in relation to FIGS. 3, 4A, and 4B. Method 600 may then store the lowest cost and origin node of the lowest cost in association with each destination node (step 608). Having determined the optimum origin node for each destination node, method 600 may then determine a shortest path from the route to each destination node (step 610), based on the origin node with the lowest cost. The shortest path may be determined by either running an iteration of Dijkstra's algorithm, aggregating intermediate outputs of the inventive method, and/or applying any other suitable route calculation methodologies. Finally, method 600 may include displaying a list and/or map of the destination nodes and the shortest path to each destination nodes (step 612). For example, after inputting an route origin, route destination, and POI thresholds, the user may be presented with a map of a route, a list of destination nodes that are within a threshold time/distance of the route, and directions to each destination node from an origin node on the route having the shortest cost. Alternatively, or additionally, the user may be presented with a map of a route having displayed thereon a plurality of destination nodes that are within a threshold time/distance of the route, and directions to each destination node from an origin node on the route having the shortest cost.

Figure 7A:
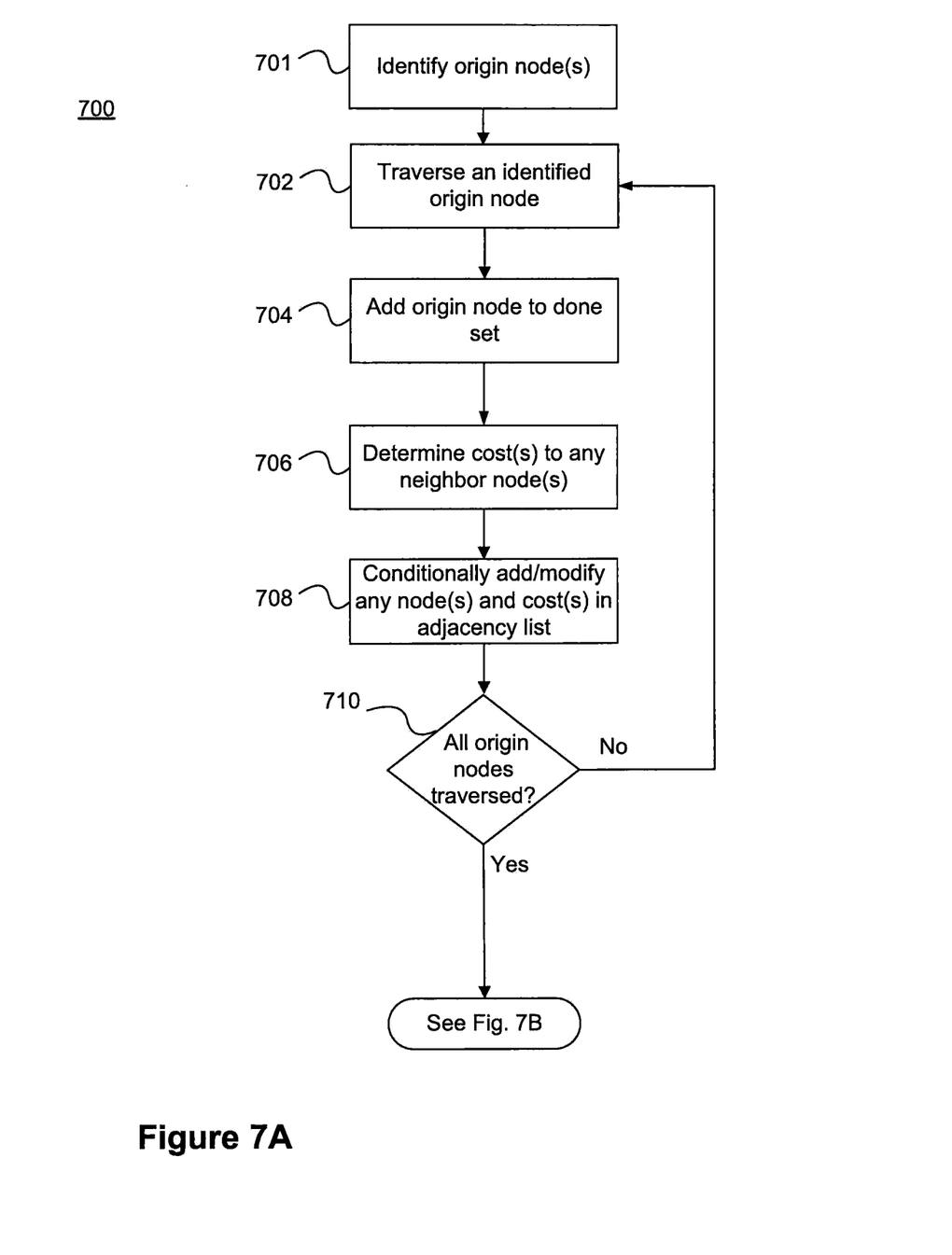
FIGS. 7A and 7B illustrate a flowchart of an exemplary method for calculating costs and determining a shortest path to at least one destination node, consistent with certain embodiments of the present disclosure.
Figure 7B:
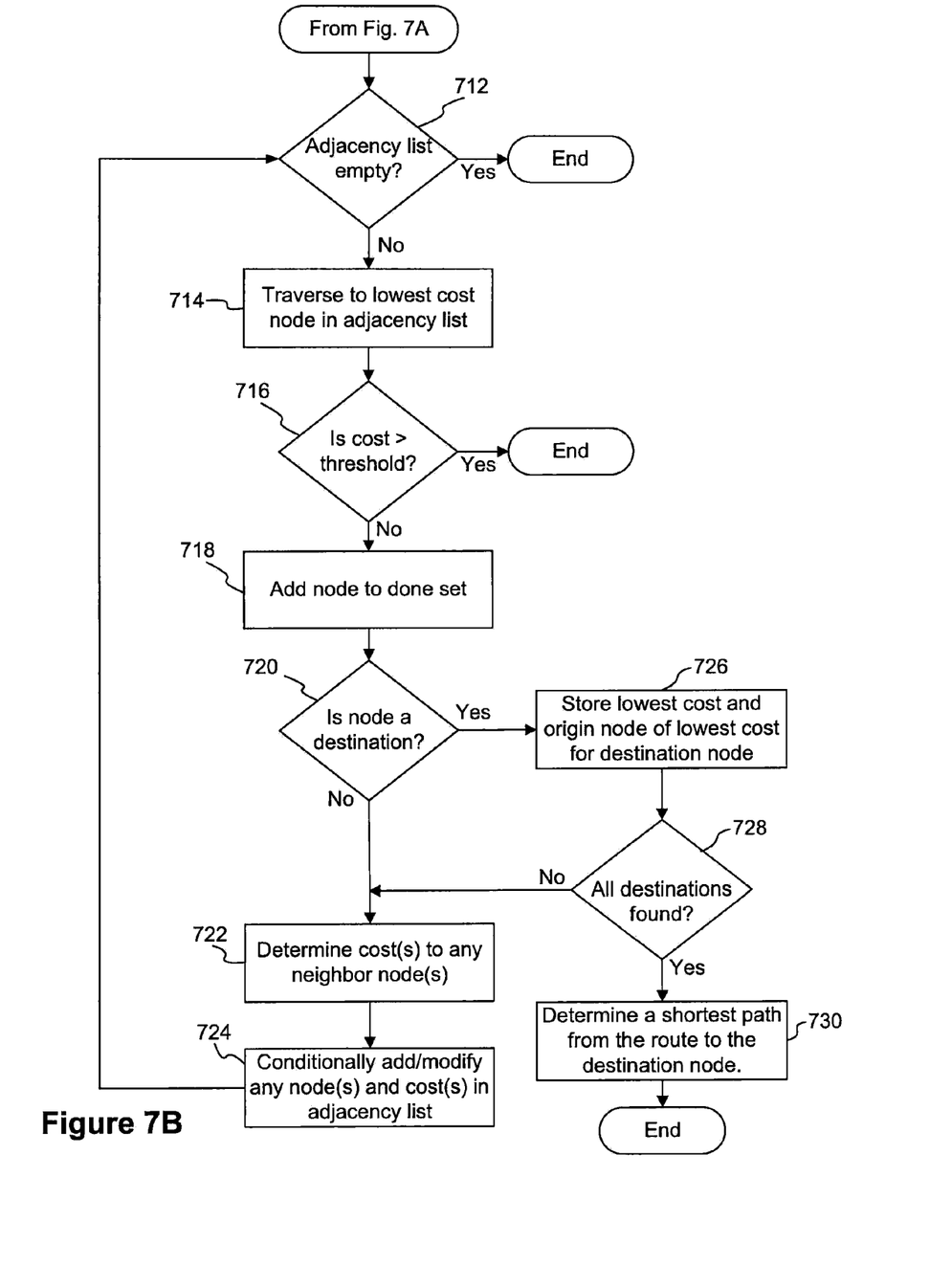

FIGS. 7A and 7B illustrate a flowchart of an exemplary method 700 for calculating costs and a shortest path to at least one destination node, consistent with embodiments of the present disclosure. Exemplary method 700 may be performed by a processor, such as processor 202 in FIG. 2. At block 701, method 700 may identify one or more origin nodes along a route. At block 702, method 700 may traverse to one of the identified origin nodes. At block 704, method 700 may then add the traversed to origin node to a done set. At block 706, method 700 may identify any neighbor nodes of the traversed origin node and determine a cost to each of the identified neighbor nodes.

At block 708, method 700 may access an adjacency list stored in memory, such as memory 208 or 210 in FIG. 2, and conditionally add or modify the neighbor nodes and associated costs in the adjacency list. For example, if a neighbor node of the traversed to origin node is not included in the adjacency list, then method 700 adds the neighbor node to the adjacency list with an associated cost of travelling from the traversed to origin node to the neighbor node. The neighbor node of the traversed to node, however, may already be included in the adjacency list. If this is so, and if the cost associated with the neighbor node stored in the adjacency list (a first cost) is greater than the cost for the neighbor node determined in block 706 (a second cost), then method 700 may overwrite the first cost with the lower second cost in the adjacency list. Alternatively, if the first cost is less than the second cost, then method 700 may not modify the adjacency list in any way, because the adjacency list already includes the lowest cost known thus far. Step 708 may be repeated for each neighbor of the traversed to origin node, so long as the neighbor has not itself been traversed to.

At block 710, method 700 may determine whether or not all origin nodes have been traversed. If all origin nodes have not been traversed to (710—No), then method 700 returns to block 702 and traverses to a remaining origin node that has not yet been traversed to. But if all origin nodes have been traversed to (710—Yes), method 700 accesses the adjacency list and, at block 712 determines whether or not the adjacency list is empty. If the adjacency list is empty (712—Yes), then method 700 ends. But if the adjacency list is not empty (712—No), method 700 determines a node that is associated with a lowest cost in the adjacency list. At block 714, method 700 traverses to the lowest cost node in the adjacency list.

At block 716, method 700 determines whether or not the cost of the node is greater than a threshold. If the cost of the node is greater than the threshold (716—Yes), then method 700 ends. But if the cost of the node is less than the threshold (716—No), then method 700 adds the node to the done set at block 718, and proceeds to block 720.

At block 720, method 700 determines whether or not the traversed to node is a destination node. If the traversed to node is not a destination node (720—No), then method 700 goes to block 722, which will be discussed below. But if the traversed to node is a destination node (720—Yes), then method 700 goes to block 726. At block 726, method 700 may identify and store the destination node, the lowest cost value for the destination node, and the associated origin node. In particular, the associated origin node may be the one that is traversed from in order to achieve the lowest cost from the route to the destination node. One or more of the lowest cost value, destination node, and associated origin node may be stored in memory.

The method then goes to block 728. At block 728, method 700 determines whether or not all destination have been found. If all destinations have not been found (728—No), then method 700 goes to block 722, which will be discussed below. But if all destinations have been found (728—Yes), method 700 goes to block 730.

At block 730, method 700 may determine the shortest path from the associated origin node to the destination node. The shortest path should have a cost associated with the determined lowest cost value. In some embodiments, the shortest path may be determined using result from computations previously performed to determine the lowest cost value. In other embodiments, the shortest path may be determined by performing another algorithm, such as Dijkstra's algorithm or some other algorithm. After block 730, method 700 ends.

In some embodiments, the traversed to node may not be a destination node (720—No). Moreover, in some embodiments, the traversed to node may be a destination node, but there may be additional destination nodes that have not yet been traversed to (728—No). In either case, there are more nodes to be traversed to, and accordingly, method 700 may go to block 722.

At block 722, method 700 may determine neighbor nodes of the traversed to node and associated costs from the route to the neighbor nodes. At block 724, method 700 conditionally adds or modifies the adjacency list according to similar criteria as in block 708. Then method 700 returns to block 712 to traverse to the lowest cost node in the adjacency list.

As shown above, method 700 may determine that the shortest path from a route to a destination node begins on a particular origin node on the route. Moreover, if a user decides to take a detour from the route to the destination node, then method 700 may be able to use the particular origin node to calculate the shortest route or path to the destination node.

Other embodiments consistent with the present disclosure will be apparent to those skilled in the art from consideration of the specification and practice of the exemplary embodiments disclosed herein. Therefore, the scope of the invention is not limited to the specific examples or embodiments described herein.

What is claimed is:

1. A computer-implemented method, comprising the steps of:
   obtaining origin data comprising data for a plurality of origin nodes disposed along a travel route, the origin nodes providing options for departing from the travel route to a destination node;
   identifying, based on the origin data, one or more of the origin nodes that fall within a threshold distance of the destination node;
   calculating, using a processor, costs associated with travelling from the identified origin nodes to the destination node through at least one intermediate node;
   determining a minimum of the computed costs and a corresponding one of the identified origin nodes associated with the minimum cost; and
   determining a path between the travel route and the destination node, the determined path comprising the corresponding one of the identified origin nodes.

2. The computer-implemented method of claim 1, wherein the determining the path comprises applying Dijkstra's algorithm to identify a shortest path between the corresponding one of the origin nodes and the destination node.

3. The computer-implemented method of claim 1, wherein the plurality of origin nodes are stored as at least one of a list, a matrix, or a queue.

4. The computer-implemented method of claim 1, further comprising:
   obtaining destination data comprising data for a plurality of destination nodes;
   modifying the destination data by removing data for one or more of the destination nodes that do not fall within the threshold distance of at least one of the obtained origin nodes; and
   identifying the destination node from the modified destination data.

5. The method of claim 1, wherein:
   the travel route comprises a route traversed in a geographic region;

the destination node comprises a point of interest in the geographic region; and the determined path comprises one or more roads in the geographic region.

6. A computer-implemented method, comprising:

obtaining origin data comprising data for a plurality of origin nodes disposed along travel route;

generating modified origin data comprising data for one or more of the origin nodes that fall within a threshold distance of a destination node, the modified origin data comprising data for a first origin node and a second origin node;

determining, using a processor, a first cost to travel from the first origin node to an intermediate node;

generating adjacency data comprising data for the intermediate node, the adjacency data associating the intermediate node with the first cost;

determining, using a processor, a second cost to travel from the second origin node to the intermediate node;

determining whether the first cost exceeds the second cost;

generating instructions to overwrite the first cost with the second cost in the adjacency data, when the first cost exceeds the second cost; and calculating, using the adjacency data, a shortest path from the travel route to the destination node, the shortest path comprising the first origin node or the second origin node.

7. The computer-implemented method of claim 6, further comprising:

obtaining destination data comprising data for a plurality of destination nodes;

modifying the destination data by removing data for one or more of the destination nodes that do not fall within the threshold distance from at least one of the obtained origin nodes; and identifying the destination node from the modified destination data.

8. The computer-implemented method of claim 6, further comprising:

identifying a node neighboring the intermediate node and a third cost associated with the neighboring node.

9. The computer implemented method of claim 8, further comprising:

determining that the neighboring node is not included in the adjacency data; and generating instructions to add data for the neighboring node and the third cost associated with the neighboring node to the adjacency data.

10. The computer implemented method of claim 8, further comprising:

determining that the adjacency data includes data for the neighboring node;

when the adjacency data comprises the neighboring node, obtaining a fourth cost associated with the neighboring node from the adjacency data;

determining whether the fourth cost exceeds the third cost; and generating instructions to overwrite the fourth cost with the third cost, when the fourth cost exceeds the third cost.

11. A system, comprising:

a server, the server comprising a storage device that stores a set of instructions and at least one processor coupled to the storage device, the at least one processor being operative with the set of instructions in order to:

obtain origin data comprising data for a plurality of origin nodes disposed along a travel route;

generate modified origin data comprising one or more of the origin nodes that fall within a threshold distance of a destination node, the modified origin data comprising data for a first origin node and a second origin node;

determine a first cost to travel from the first origin node to an intermediate node;

generate adjacency data comprising data for the intermediate node, the adjacency data associating the intermediate node with the first cost;

determine a second cost to travel from the second origin node to the intermediate node;

determine whether the first cost exceeds the second cost;

generating instructions to overwrite the first cost with the second cost in the adjacency data, when the first cost exceeds the second cost; and calculate, using the adjacency data, a shortest path from the travel route to the destination node, the shortest path comprising the first origin node or the second origin node.

12. The system of claim 11, wherein the at least one processor is further operative with the set of instructions to:

obtain destination data comprising data for a plurality of destination nodes:

modify the destination data by removing data for one or more of the destination nodes that do not fall within the threshold distance from at least one of the obtained origin nodes; and identify the destination node from the modified destination data.

13. The system of claim 11, wherein the at least one processor is further operative with the set of instructions to:

identify a node neighboring the intermediate node and a third cost associated with the neighboring node.

14. The system of claim 13, wherein the at least one processor is further operative with the set of instructions to:

determine that the neighboring node is not included in the adjacency data; and generating instructions to add data for the neighboring node and the third cost associated with the neighboring node to the adjacency data.

15. The system of claim 13, wherein the at least one processor is further operative with the set of instructions to:

determine that the adjacency data includes data for the identified node;

when the adjacency data comprises the neighboring node, obtain a fourth cost associated with the neighboring node from the adjacency data;

determine whether the fourth cost exceeds the third cost; and generating instructions to overwrite the fourth cost with the third cost, when the fourth cost exceeds the third cost.

16. A tangible, non-transitory computer-readable medium comprising program instructions that, when executed by at least one processor, cause the at least processor to perform the following steps:

obtaining origin data comprising data for a plurality of origin nodes disposed along a travel route;

generating modified origin data comprising date for one or more of the origin nodes that fall within a threshold distance of a destination node, the modified origin data comprising data for a first origin node, and a second origin node;

determining a first cost to travel from the first origin node to an intermediate node;

generating adjacency data comprising data for the intermediate node, the adjacency data associating the intermediate node with the first cost;

determining a second cost to travel from the second origin node to the intermediate node;

determining whether the first cost exceeds the second cost;

generating instructions to overwrite the first cost with the second cost in the adjacency data, when the first cost exceeds the second cost; and calculating, using the adjacency data, a shortest path from the travel route to the destination node, the shortest path comprising the first origin node or the second origin node.

17. The tangible, non-transitory computer-readable medium of claim 16, wherein the method further comprises:

accessing destination data comprising data for a plurality of destination nodes;

modifying the destination data by removing data for one or more of the destination nodes that do not fall within the threshold distance of at least one of the first or second origin nodes; and identifying the destination node from the modified destination data.

18. The tangible non-transitory computer-readable medium of claim 16, wherein the method further comprises:

identifying a node neighboring the intermediate node and a third cost associated with the neighboring node.

19. The tangible, non-transitory computer-readable medium of claim 18, wherein the method further comprises:

determining that the neighboring node is not included in the adjacency data; and generating instructions to add data for the neighboring node and the third cost associated with the neighboring node to the adjacency data.

20. The tangible, non-transitory computer-readable medium of claim 18, wherein the method further comprises:

determining that the adjacency data includes data for the neighboring node;

when the adjacency data comprises the neighboring node, obtaining a fourth cost associated with the neighboring node from the adjacency data;

determining whether the fourth cost exceeds the third cost; and generating instructions to overwrite the fourth cost with the third cost, when the fourth cost exceeds the third cost.

* * * * *